(12) United States Patent
Park

(10) Patent No.: US 11,476,535 B2
(45) Date of Patent: Oct. 18, 2022

(54) BATTERY PACK

(71) Applicant: Samsung SDI Co., Ltd., Yongin-si (KR)

(72) Inventor: Kwangyoung Park, Yongin-si (KR)

(73) Assignee: Samsung SDi Co., Ltd., Yongin-si (KR)

( * ) Notice: Subject to any disclaimer, the term of this patent is extended or adjusted under 35 U.S.C. 154(b) by 0 days.

(21) Appl. No.: 16/764,284

(22) PCT Filed: Sep. 21, 2018

(86) PCT No.: PCT/KR2018/011300
§ 371 (c)(1),
(2) Date: Jun. 2, 2020

(87) PCT Pub. No.: WO2019/098521
PCT Pub. Date: May 23, 2019

(65) Prior Publication Data
US 2020/0403198 A1 Dec. 24, 2020

(30) Foreign Application Priority Data
Nov. 15, 2017 (KR) .................. 10-2017-0152505

(51) Int. Cl.
H01M 50/24 (2021.01)
H01M 50/581 (2021.01)

(52) U.S. Cl.
CPC ......... *H01M 50/24* (2021.01); *H01M 50/581* (2021.01)

(58) Field of Classification Search
None
See application file for complete search history.

(56) References Cited

U.S. PATENT DOCUMENTS 8,039,145 B2  10/2011  Ha et al.
8,440,341 B2   5/2013  Kim
(Continued)

FOREIGN PATENT DOCUMENTS

CA       2589892    6/2006
CN     101354937    1/2009
(Continued)

OTHER PUBLICATIONS

International Search Report dated Dec. 12, 2018, in International Application No. PCT/KR2018/011300 (with English Translation).
(Continued)

*Primary Examiner* — Wyatt P McConnell
(74) *Attorney, Agent, or Firm* — H.C. Park & Associates, PLC

(57) ABSTRACT

A battery pack includes: a plurality of unit cells arranged side by side in a first direction and each comprising a first terminal and a second terminal to improve the durability and safety of the battery pack; a protection circuit module disposed on the plurality of unit cells; and a temperature element unit disposed on the plurality of unit cells in the first direction and comprising a first temperature element, a second temperature element, a first plate connecting the first temperature element and the second temperature element, and a second plate having an end electrically connected to the protection circuit module and another end electrically connected to the first plate disposed between the first temperature element and the second temperature element.

20 Claims, 7 Drawing Sheets

(56) References Cited

U.S. PATENT DOCUMENTS

| | | |
|---|---|---|
| 8,962,178 B2 | 2/2015 | Choi |
| 9,019,709 B2 | 4/2015 | Jang |
| 9,246,199 B2 | 1/2016 | Wang et al. |
| 9,496,709 B2 | 11/2016 | Koh |
| 2006/0177733 A1 | 8/2006 | Ha et al. |
| 2009/0027821 A1 | 1/2009 | Colby et al. |
| 2010/0273033 A1 | 10/2010 | Fujikawa et al. |
| 2012/0231300 A1 | 9/2012 | Park et al. |
| 2012/0301748 A1 | 11/2012 | Choi |
| 2014/0212697 A1* | 7/2014 | Wang ............... H01M 50/502 429/7 |
| 2014/0220414 A1 | 8/2014 | Lee |
| 2015/0249246 A1 | 9/2015 | Byun |

FOREIGN PATENT DOCUMENTS

| | | |
|---|---|---|
| CN | 103972459 | 8/2014 |
| JP | 2008-521199 | 6/2008 |
| KR | 10-0760784 | 9/2007 |
| KR | 10-2010-0136107 | 12/2010 |
| KR | 10-2013-0023033 | 3/2012 |
| KR | 10-2012-0054338 | 5/2012 |
| KR | 10-2013-0023052 | 3/2013 |
| KR | 10-1386167 | 4/2014 |
| KR | 10-2014-0099398 | 8/2014 |
| KR | 10-2015-0103464 | 9/2015 |
| KR | 10-2014-0097731 | 8/2018 |

OTHER PUBLICATIONS

Grant of Patent dated Apr. 23, 2020 in Korean Patent Application No. 10-2017-0152505.

Chinese Office Action dated Jan. 19, 2022, issued to Chinese Patent Application No. 201880074016.3.

\* cited by examiner

BATTERY PACK

CROSS REFERENCE TO RELATED APPLICATION

This application is a National Stage Entry of International Patent Application No. PCT/KR2018/011300, filed on Sep. 21, 2018, and claims priority from and the benefit of Korean Patent Application No. 10-2017-0152505, filed on Nov. 15, 2017, which is hereby incorporated by reference for all purposes as if fully set forth herein.

BACKGROUND

Field

Exemplary embodiments/implementations of the invention relate generally to a battery pack.

Discussion of the Background

Due to the developments in the wireless Internet and communications technology, portable electronic devices operable with batteries, without other power sources, have been commonly used. Among them, portable computers have portability because they are small in size and easy to carry around, and thus the portable computers are widely used for business or private purposes. The portable computer may include a battery pack to be used in diverse places without any limitation on a power supply device. The battery pack may include unit cells that may be repeatedly used through the recharge and discharge to provide a sufficient amount of outputs.

The above information disclosed in this Background section is only for understanding of the background of the inventive concepts, and, therefore, it may contain information that does not constitute prior art.

SUMMARY

Applicant discovered that during charging or discharging operations of battery pack with a high current for rapid charge or discharge a temperature element can be damaged due to heat generated by the high current flowing in the temperature element, which is a path through which a protection circuit module is connected to unit cells of the battery pack.

Battery packs constructed according to the principles and exemplary implementations of the invention have improved durability and safety. For example, in the battery pack, a current flowing in a first plate is branched by electrically connecting a second plate to a branch part of the first plate such that a relatively low current is allowed to flow in the temperature element connected to ends of branches of the first plate. Thus, damage to the temperature element during the rapid recharge may be prevented. Also, the second plate, in which a relatively high current flows, may include a material having a lower resistance than the first plate, and an exothermic reaction of the part where a high current flows may be noticeably improved.

According to an aspect of the invention, battery pack includes: a plurality of unit cells arranged side by side in a first direction (a +x direction) and each comprising a first terminal and a second terminal; a protection circuit module disposed on the plurality of unit cells; and a temperature element unit disposed on the plurality of unit cells in the first direction and comprising a first temperature element, a second temperature element, a first plate connecting the first temperature element and the second temperature element, and a second plate having an end electrically connected to the protection circuit module and another end electrically connected to the first plate disposed between the first temperature element and the second temperature element.

The first current flow path may be configured to conduct a first current through the second plate, a second current flow path may be configured to conduct a second current to the first temperature element through the first plate and a branch part that connects the second plate and the first plate, a third current flow path may be configured to conduct a third current to the second temperature element through the first plate and the branch part, and a sum of the second current and the third current may be equal to the first current.

The second current flow path may pass through the first temperature element, the third current flow path may pass through the second temperature element, and the second current may be identical to the third current.

The first plate may include first metal, and the second plate may include second metal that is different from the first metal.

The second metal may have a lower resistance than the first metal.

The second metal may have higher thermal conductivity than the first metal.

The first plate and the second plate may be welded together.

The battery pack may further include a first tab electrically connected to the first terminal and a second tab electrically connected to the second terminal.

The first temperature element may include a first sub-lid and a second sub-lid respectively disposed on both ends of the first temperature element, the second temperature element may include a third sub-lid and a fourth sub-lid disposed on both ends of the second temperature element, an end of the first plate may be electrically connected to the first sub-lid, and another end of the first plate may be electrically connected to the third sub-lid.

The first tab may be electrically connected to the second sub-lid, and the second tab may be electrically connected to the fourth sub-lid.

The first tab and the second tab may include first metal.

The first sub-lid and the second sub-lid of the first temperature element, and the third sub-lid and the fourth sub-lid of the second temperature element may include second metal.

The battery pack may further include a third temperature element connected to the first plate.

The battery pack may further include a fourth current flow path configured to conduct a fourth current to the third temperature element through the first plate with respect to the branch part, wherein the fourth current may be identical to each of the second current and the third current.

The first plate and the second plate may be integrally formed of the same material.

A width of the second plate may be greater than a width of the first plate.

A thickness of the second plate may be greater than a thickness of the first plate.

In addition to the above effects, other effects may be derived from descriptions below with reference to the attached drawings.

BRIEF DESCRIPTION OF DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
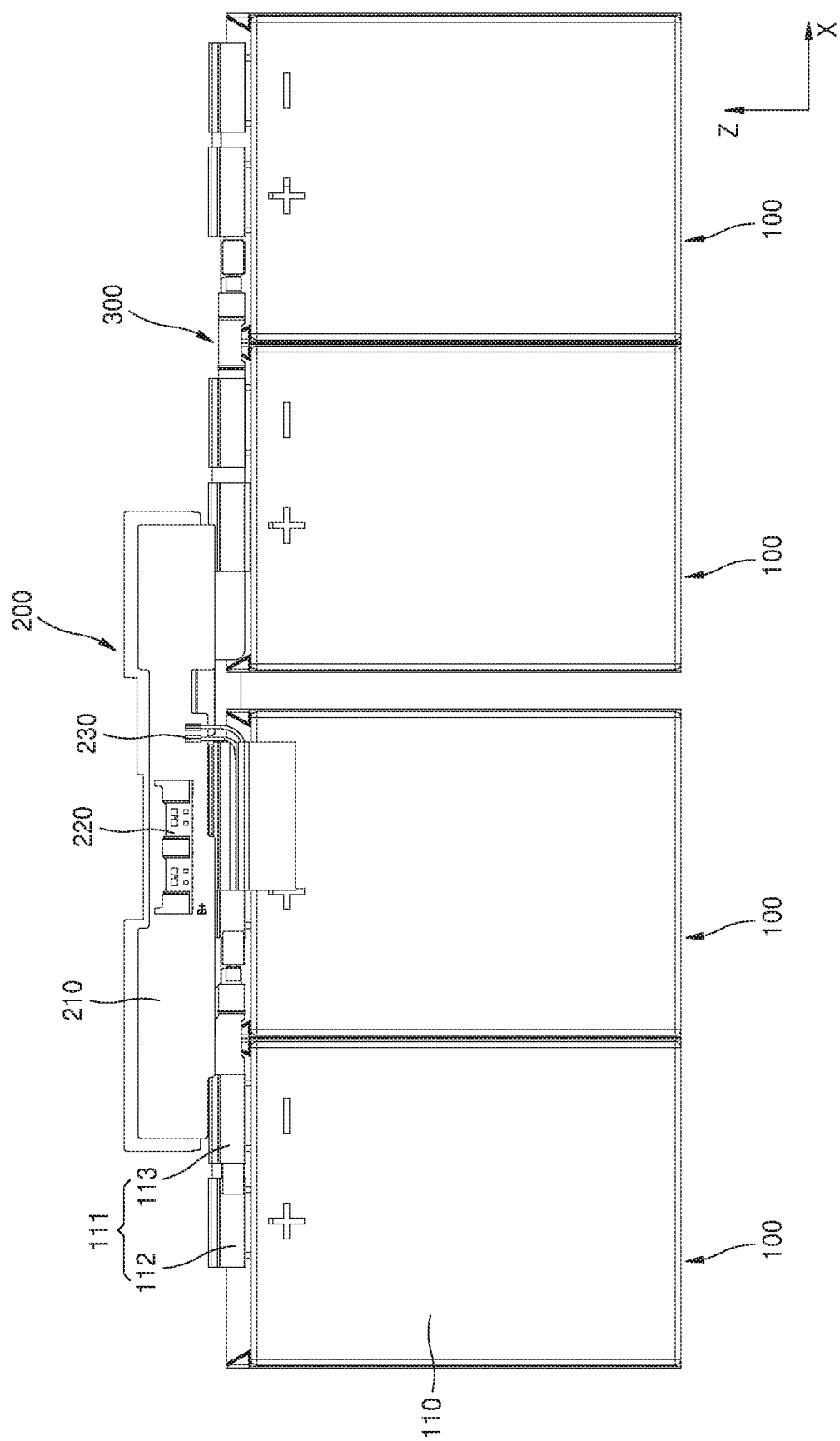
FIG. 1 is a schematic front view of an exemplary embodiment of a battery pack constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

FIG. 1 is a schematic front view of an exemplary embodiment of a battery pack constructed according to the principles of the invention.

Referring to FIG. 1, the battery pack according to an exemplary embodiment includes a plurality of unit cells 100, a protection circuit module 200 disposed on the plurality of unit cells 100, and a temperature element unit 300 including a first temperature element 330, a second temperature element 340, a first plate 310, and a second plate 320.

The plurality of unit cells 100 may be arranged side by side in a first direction (a +x direction). For example, the unit cells 100 may be arranged side by side to make side surfaces, for example, front surfaces, face in the same direction. Adjacent unit cells 100 may have side surfaces facing each other. The unit cell 100 may be a rechargeable secondary lithium-ion battery, but one or more embodiments of the invention are not limited thereto.

Each of the plurality of unit cells 100 may include a battery case 110 and an electrode assembly sealed with an electrolyte in the battery case 110. The electrode assembly may include a first electrode plate and a second electrode plate, on which an electrode active material is spread, and a separator disposed therebetween. In this case, the first electrode plate may be a positive electrode plate, and the second electrode plate may be a negative electrode plate. The electrode assembly may be manufactured in a manner that the first electrode plate, the separator, and the second electrode plate are sequentially stacked and rolled into a jelly-roll shape. In the illustrated exemplary embodiment, a case where the electrode assembly has a jelly-roll shape is described, but one or more exemplary embodiments are not limited thereto. As another exemplary embodiment, the electrode assembly may be a stack structure in which the first electrode plate, the separator, and the second electrode plate are sequentially stacked.

Each of the plurality of unit cells 100 may include a terminal 111 extending to the outside of the battery case 110, and the terminal 111 may include a first terminal 112 electrically connected to the first electrode plate and a second terminal 113 electrically connected to the second electrode plate. In another exemplary embodiment, locations of the first terminal 112 and the second terminal 113 may be changed to each other. Electrochemical energy generated by the terminal 111 in the unit cell may be transmitted to the outside.

The battery case 110 may include therein an electrode assembly as a member covering the electrode assembly. Therefore, a shape and a size of the battery case 110 may correspond to those of the electrode assembly.

The protection circuit module 200 may be disposed on the plurality of unit cells 100. Electrically connected to the plurality of unit cells 100, the protection circuit module 200 may control the recharge and discharge of the unit cells 100, and thus overheating and explosion caused due to overcharge, over-discharge, or an overcurrent may be prevented. As the first and second terminals 112 and 113 disposed on the front surfaces of the unit cells 100 are connected to the protection circuit module 200, the unit cells 100 may be electrically connected to the protection circuit module 200.

The protection circuit module 200 may include a circuit board 210, protection devices 220 mounted on the circuit board 210, a temperature sensor 230, and the like. For example, the circuit board 210 may be elongated in an arrangement direction of the unit cells 100. The protection device 220 may selectively include a safety device including passive elements such as a resistance and a condenser and active elements such as a field effect transistor, or integrated circuits.

On the circuit board 210, circuit patterns capable of connecting the unit cells 100 in series and/or parallel are formed. Therefore, as the terminal 111 of each unit cell 100 is directly connected to the circuit board 210, the recharge/discharge of the unit cells 100 may be controlled according to the operation of the protection device 220 and at the same time, the unit cells 100 may be connected in series and/or parallel.

The temperature sensor 230 may be disposed on the circuit board and may sense a temperature of the unit cell 100. For example, the temperature sensor 230 may be a thermistor. When the temperature sensor 230 is in a wire form, the temperature sensor 230 may include a cable and a main body disposed on one end of the cable. The other end of the cable of the temperature sensor 230 may be electrically connected to the protection circuit module 200, and temperature information sensed by the main body may be transmitted to the protection circuit module 200 through the cable.

The battery pack according to the illustrated exemplary embodiment may include a temperature element unit 300 disposed on the plurality of unit cells 100 in a first direction (a +x direction). The temperature element unit 300 may include a first temperature element 330, a second temperature element 340, the first plate 310, and the second plate 320. The temperature element unit 300 will be described in detail with reference to the attached drawings.

Figure 2:
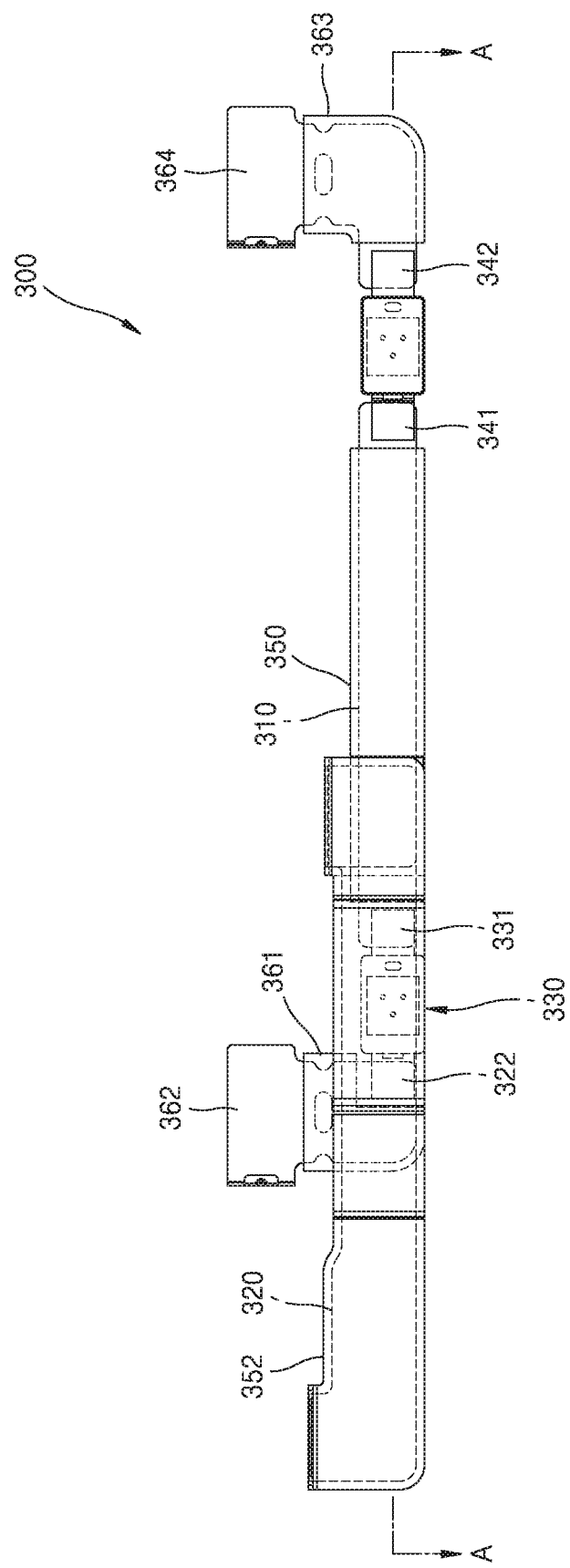
FIG. 2 is a schematic plan view of a temperature element unit of the battery pack of FIG. 1.
Figure 3:
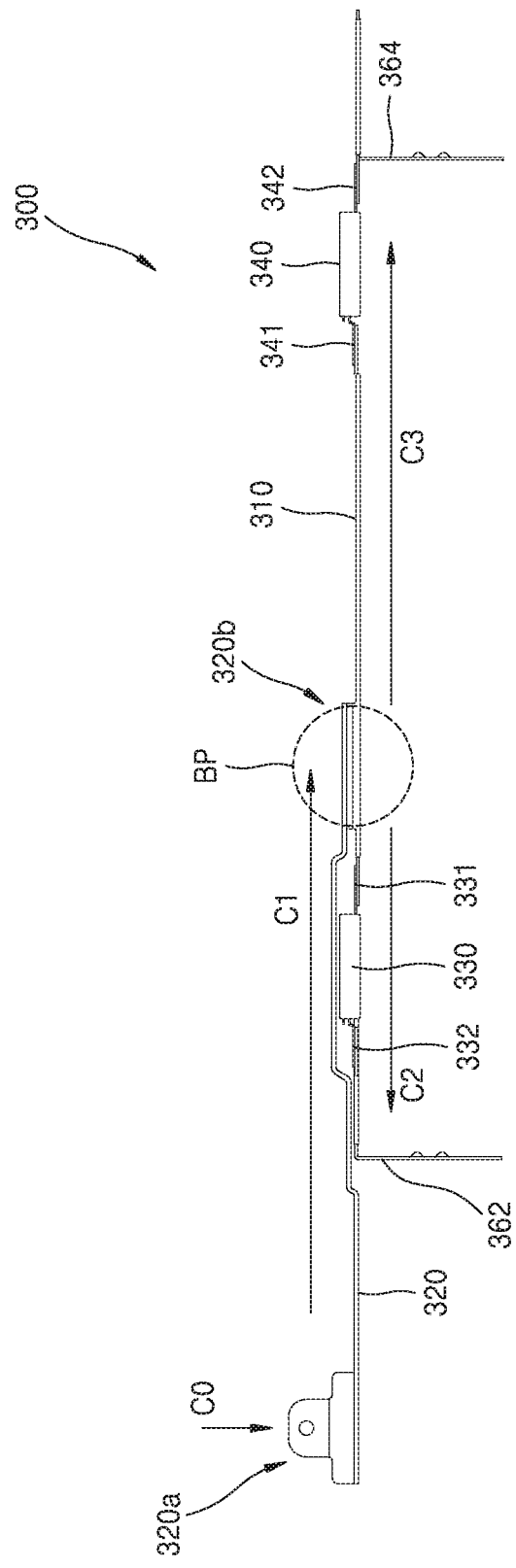
FIG. 3 is a schematic cross-sectional view of the temperature element unit of FIG. 2, taken along a line A-A.
Figure 4:
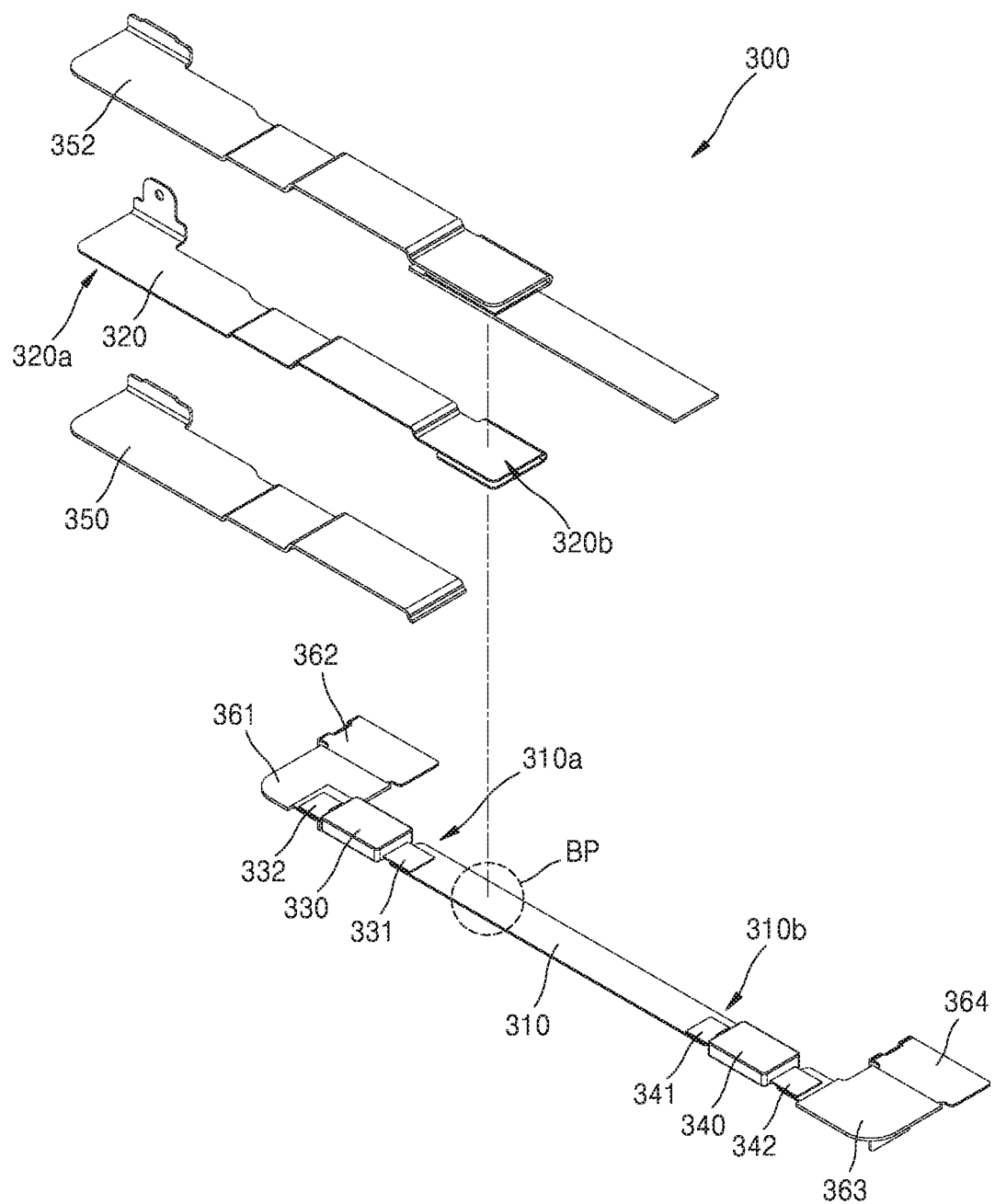
FIG. 4 is an exploded perspective view of the temperature element unit of FIG. 2.

FIG. 2 is a schematic plan view of the temperature element unit 300 of the battery pack of FIG. 1, FIG. 3 is a schematic cross-sectional view of the temperature element unit 300 of FIG. 2, taken along a line A-A', and FIG. 4 is an exploded perspective view of the temperature element unit 300 of FIG. 2.

Referring to FIGS. 2 and 4, the temperature element unit 300 according to the illustrated exemplary embodiment may include the first temperature element 330, the second temperature element 340, the first plate 310 electrically connecting the first temperature element 330 to the second temperature element 340, and the second plate 320 electrically connecting the first plate 310 to the protection circuit module 200.

The first temperature element 330 and the second temperature element 340 may function as fuses that block currents when temperatures of the unit cells 100 exceed a reference value. For example, the first and second temperature elements 330 and 340 may each be a thermal cutoff (TCO). The first temperature element 330 may include a first sub-lid 331 and a second sub-lid 332 that are respectively disposed on both ends of the first temperature element 330. Likewise, the second temperature element 340 may include a third sub-lid 341 and a fourth sub-lid 342 that are respectively disposed on both ends of the second temperature element 340.

The first plate 310 may be disposed between the first temperature element 330 and the second temperature element 340 to electrically connect the first temperature element 330 and the second temperature element 340.

Referring to FIG. 4, the description that the first plate 310 is disposed between the first temperature element 330 and the second temperature element 340 may indicate that one end 310a of the first plate 310 is electrically connected to the first sub-lid 331 of the first temperature element 330 and the other end 310b of the first plate 310 is electrically connected to the second sub-lid 332 of the first temperature element 340. The first plate 310 may include a metallic material to electrically connect the first temperature element 330 and the second temperature element 340.

The second plate 320 may be disposed on the first plate 310. In the present embodiment, the first plate 310 may be connected to the second plate 320 by, for example, welding. The second plate 320 according to the illustrated exemplary embodiment may electrically connect the protection circuit module 200 to the first plate 310. That is, one end 320a of the second plate 320 may be electrically connected to the circuit board of the protection circuit module 200, and the other end 320b of the second plate 320 may be connected to the first plate 310 connecting the first temperature element 330 and the second temperature element 340. In this case, the other end 320b of the second plate 320 may contact a portion between the end 310a and the other end of the first plate 310.

FIG. 4 shows that the other end 320b of the second plate 320 is concentrated towards not a central portion of the first plate 310 but the first temperature element 330 at a certain interval, but it is sufficient that the other end 320b of the second plate 320 contacts the first plate 310 between the first temperature element 330 and the second temperature element 340.

Referring to FIG. 3, as described above, the other end 320b of the second plate 320 may be attached to the first plate 310, and a portion where the first plate 310 is connected to the second plate 320 may be defined as a branch part BP. The branch part BP may be understood as a part where a current flowing in the second plate 320 is transmitted to the first plate 310, and with respect to the branch part BP, the current transmitted to the first plate 310 may be branched into the first temperature element 330 and the second temperature element 340, respectively.

A first insulation film 350 may be disposed between the first plate 310 and the second plate 320. The first insulation film 350 may be disposed over portions except the branch part BP where the first plate 310 contacts the second plate 320. That is, the first insulation film 350 may electrically insulate the first plate 310 and the second plate 320 in a region other than the branch part BP.

Also, a second insulation film 352 may be disposed on the second plate 320. The second insulation film 352 may be disposed on the second plate 320 and may insulate an upper portion of the second plate 320. In some cases, the first insulation film 350 and the second insulation film 352 may include adhesive materials on one surface or both surfaces.

In the illustrated exemplary embodiment, the first plate 310 and the second plate 320 may each include a metallic material having electrical conductivity. The first plate 310 may include first metal, and the second plate 320 may include second metal that is different from the first metal. In this case, the second metal may have a lower resistance and higher heat conductivity than the first metal. For example, in the illustrated exemplary embodiment, the first metal may be nickel (Ni), and the second metal may be copper (Cu). In this case, since Cu has a resistance four times as low as that of Ni, the second plate 320, in which a relatively high current flows, may include a material having a lower resistance than the first plate 310. As a result, an exothermic reaction of the second plate 320 in which a high current flows may be improved.

Referring to FIGS. 2 and 3, the end 310a of the first plate 310 may be connected to the first temperature element 330, and the other end 310b of the first plate 310 may be connected to the second temperature element 340. The first temperature element 330 may include the first sub-lid 331 and the second sub-lid 332 respectively disposed on both ends of the first temperature element 330 and may be electrically connected to the first plate 310 through the first sub-lid 331. The second temperature element 340 may include the third sub-lid 341 and the fourth sub-lid 342 respectively disposed on both ends of the second temperature element 340, and the second temperature element 340 may be electrically connected to the first plate 310 through the third sub-lid 341.

The second sub-lid 332 may be connected to a first tab 362. Also, the fourth sub-lid 342 may be connected to a second tab 364. The first tab 362 and the second tab 364 may be electrically connected to the first terminal 112 and the second terminal 113 of the unit cells 100, respectively. Insulation films 361 and 363 may be disposed respectively on the first tab 362 and the second tab 364.

FIG. 3 shows an amount of currents flowing through the first plate 310, the second plate 320, the first temperature element 330, and the second temperature element 340.

Referring to FIG. 3, as described above, the first plate 310 and the second plate 320 may contact each other at the branch part BP. As shown in FIG. 4, in portions other than the branch part BP, the first insulation film 350 may be disposed between the first plate 310 and the second plate 320 to insulate the same.

Referring to a current transmission process, when a current flowing from the protection circuit module 200 to the temperature element unit 300 is defined as an initial current C0, the initial current C0 may flow to the second plate 320. In the second plate 320, when a region, where a current inflows, is defined as one end 320a of the second plate 320, and a region of the branch part BP is defined as the other end 320b of the second plate 320, a first current C1 may flow from the end 320a to the other end 320b of the second plate 320. In this case, the initial current C0 may be identical to the first current C1.

Also, in the first plate 310, with respect to the branch part BP where the second plate 320 contacts the first plate 310, a second current C2 may flow to the first temperature element 330 through the first plate 310. Also, with respect to the branch part BP, a third current C3 may flow to the second temperature element 340 through the first plate 310. In the illustrated exemplary embodiment, a sum of the second current C2 and the third current C3 may be equal to the first current C1. That is, the first current C1 flowing through the second plate 320 may flow to the first plate 310 through the branch part BP, and the current flowing to the first plate 310 through the branch part BP may flow to the end 310a of the first plate 310, where the first temperature element 330 is disposed, and the other end 320b of the second plate 320 where the second temperature element 340 is disposed.

Therefore, the second current C2 and the third current C3 flowing to the first temperature element 330 and the second temperature element 340 may be lower than the first current C1 flowing to the first plate 310 from the second plate 320. Sizes of the second current C2 and the third current C3 may differ according to a location and a resistance of the branch part BP disposed between the end 310a and the other end 310b of the first plate 310, but the second current C2 and the third current C3 are smaller than the first current C1, and a sum of the second current C2 and the third current C3 is equal to the first current C1. The current flowing in the first temperature element 330 and the second temperature element 340 may be small compared to the current flowing from the protection circuit module 200 to the unit cells 100 based on the above structure, and thus, although a high current flows from the protection circuit module 200, damage to the first temperature element 330 and the second temperature element 340 by the high current may be prevented.

In the case of the battery pack capable of being recharged and discharged, there may be a need to apply a high current for rapid recharge, and in this case, heat is generated because a high current flows in part of the temperature element unit, which is a path through which the protection circuit module is connected to the unit cells, and thus the temperature element is damaged.

In the battery pack according to an exemplary embodiment of the invention, as the current flowing in the first plate 310 is branched by electrically connecting the second plate 320, in which the high current flows, to the branch part BP of the first plate 310, a relatively low current is allowed to flow in the first temperature element 330, which is disposed between the end 310a and the other end 310b of the first plate 310, and the second temperature element 340, and thus damage to the temperature device during rapid recharge may be prevented. Also, by forming the second plate 320, in which a relatively high current flows, to include a material having a lower resistance than the first plate 310, an exothermic reaction of a portion where a high current flows may be considerably improved.

Figure 5:
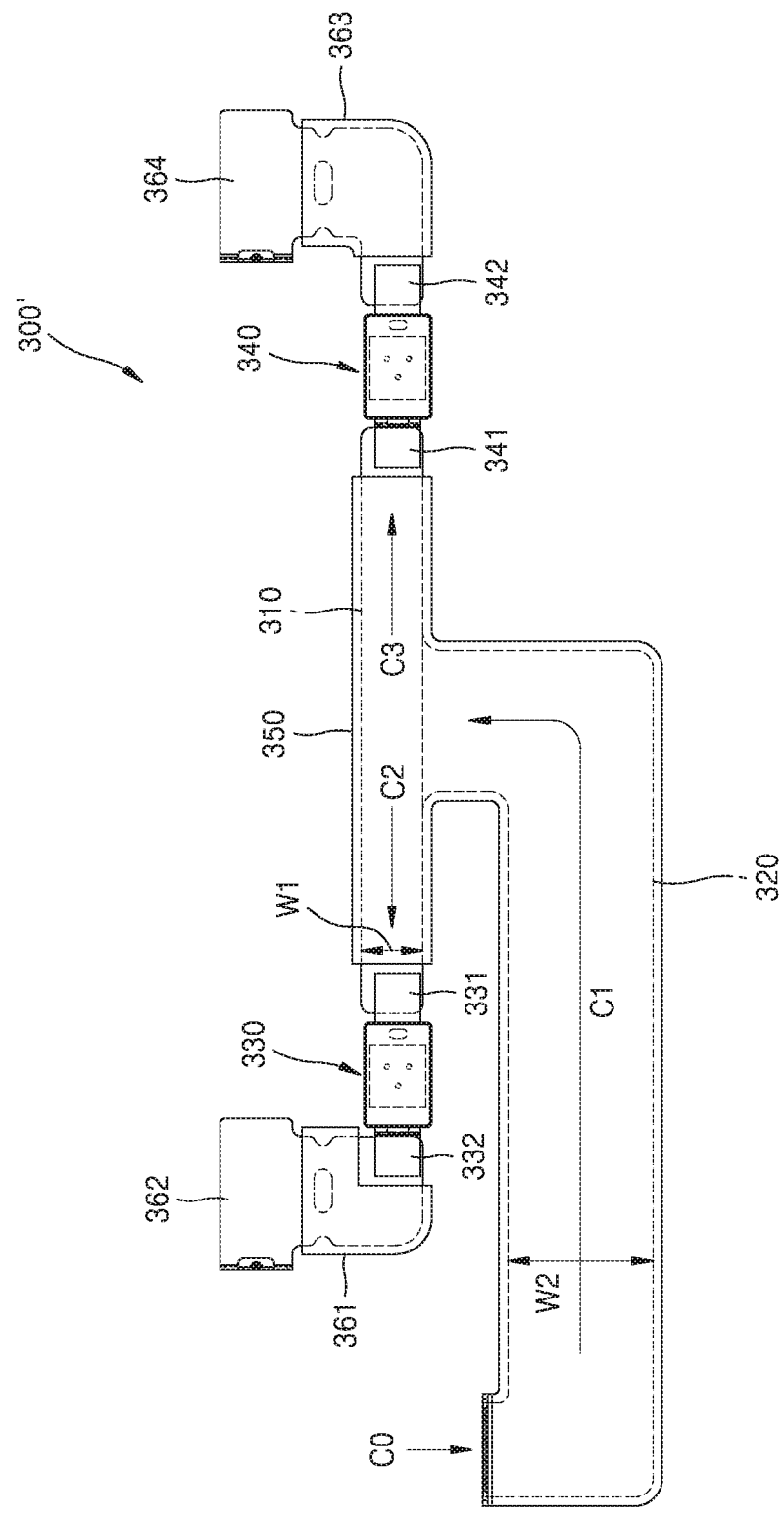
FIG. 5 is a schematic plan view of part of a battery pack according to another exemplary embodiment of the invention.

FIG. 5 is a schematic plan view of part of a battery pack according to another embodiment.

Referring to FIG. 5, the battery pack according to another embodiment includes the plurality of unit cells 100, the protection circuit module 200 disposed on the plurality of unit cells 100, and a temperature element unit 300' including the first temperature element 330, the second temperature element 340, the first plate 310, and the second plate 320. A difference exists between the battery pack according to the illustrated exemplary embodiment and the battery pack according to the above embodiment in terms of a shape of the temperature element unit 300', in particular, shapes of the first plate 310 and the second plate 320. Since configurations, other than the shape of the temperature element unit 300', are the same as described above, the difference will be mainly described hereinafter.

In the illustrated exemplary embodiment, the first plate 310 and the second plate 320 are not separate members and may be integrally formed with the same material. That is, as shown in FIG. 5, the first plate 310 and the second plate 320 may be understood as members for electrically connecting the protection circuit module 200, the first temperature element 330, and the second temperature element 340, and the first plate 310 and the second plate may be partitioned by their widths. Also, both ends of the first plate 310 may be electrically connected to the first temperature element 330 and the second temperature element 340, respectively, and one end of the second plate 320 may be electrically connected to the protection circuit module 200 and the other end of the second plate 320 to a central portion of the first plate 310. The first insulation film 350 may be disposed on the first plate 310 and the second plate 320.

In the illustrated exemplary embodiment, a width of the second plate 320 may be greater than that of the first plate 310. As shown in FIG. 5, a width W2 of the second plate 320 may be greater than a width W1 of the first plate 310.

The first current C1 may flow through the second plate 320, and with respect to the branch part BP where the second plate 320 and the first plate 310 are connected, the first current C1 may be branched into the second current C2 flowing towards the first temperature element 330 and the third current C3 flowing towards the second temperature element 340. Therefore, the first current C1 has a relatively greater size compared to the second current C2 and the third current C3, and in this case, an exothermic reaction of a region where a high current flows may be considerably improved by increasing the width of the second plate 320.

In another embodiment, a thickness of the second plate 320 may be greater than that of the first plate 310. Even in this case, the exothermic reaction of the region where the high current flows may be considerably improved by increasing the thickness of the second plate 320.

Figure 6:
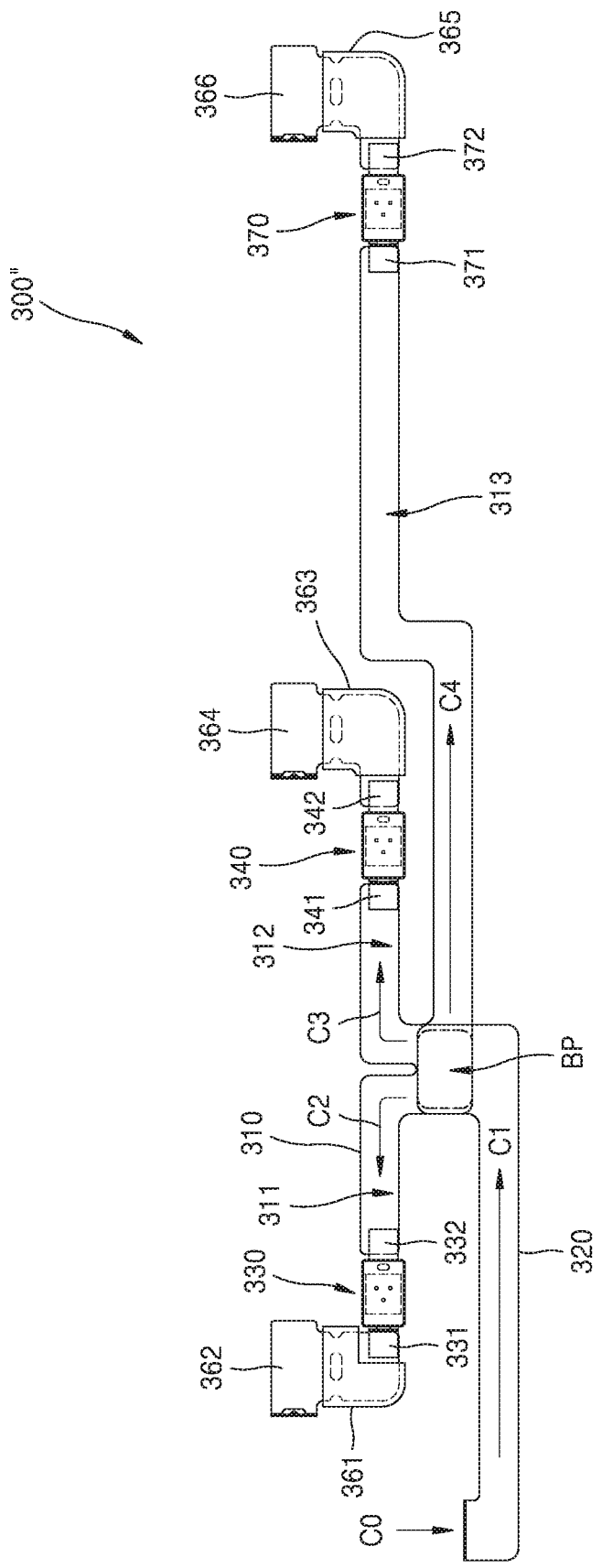
FIG. 6 is a schematic plan view of part of a battery pack according to another exemplary embodiment of the invention.
Figure 7:
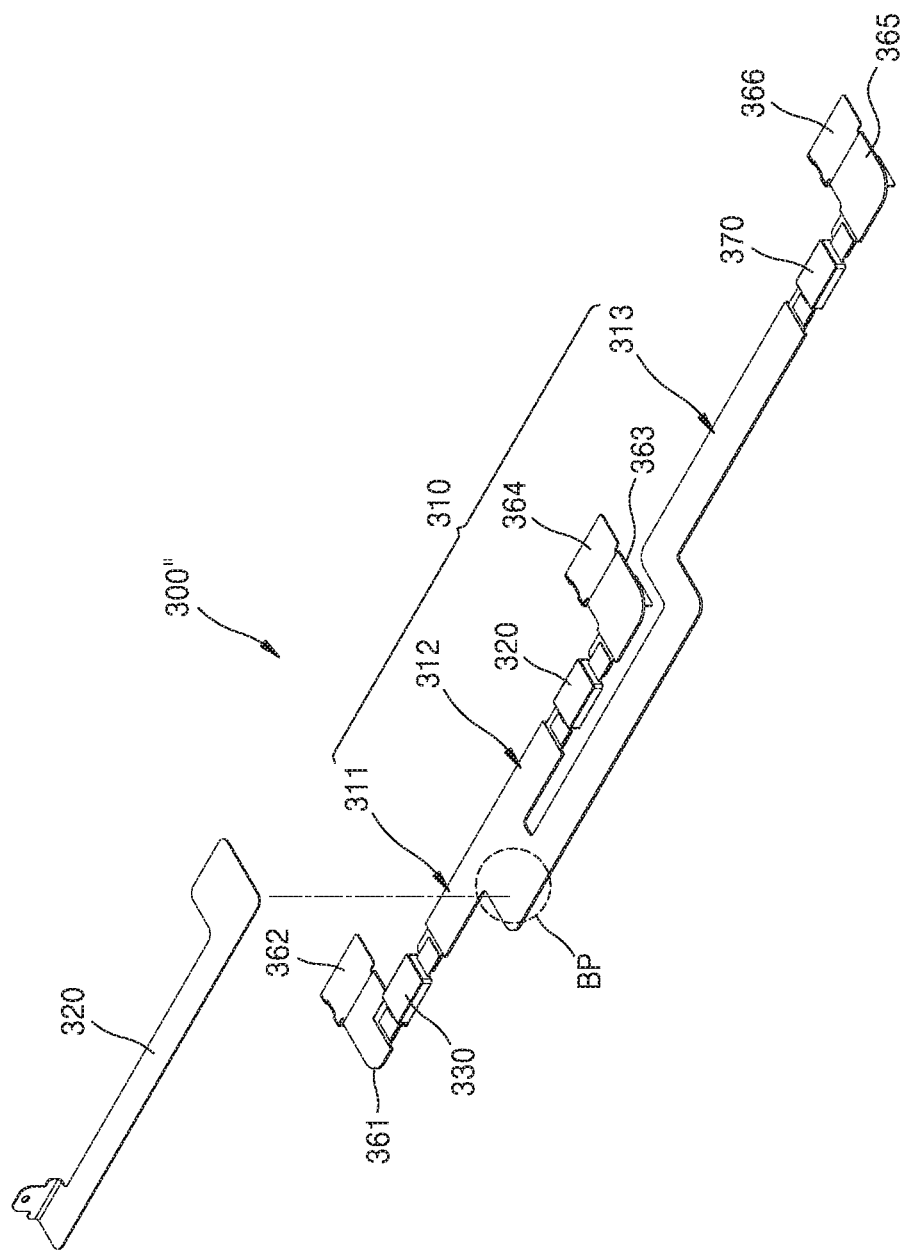
FIG. 7 is an exploded perspective view of part of the battery pack of FIG. 6.

FIG. 6 is a schematic plan view of part of a battery pack according to another embodiment of the invention, and FIG. 7 is an exploded perspective view of part of the battery pack of FIG. 6.

Referring to FIGS. 6 and 7, the battery pack according to another embodiment includes the plurality of unit cells 100, the protection circuit module 200 disposed on the unit cells 100, and a temperature element unit 300" including the first temperature element 330, the second temperature element 340, a third temperature element 370, the first plate 310, and the second plate 320. The battery pack according to the illustrated exemplary embodiment differs from the battery packs according to the above embodiments in terms of the shape of the temperature element unit 300". Since configurations, other than the shape of the temperature element unit 300", are the same as described above, the difference will be mainly described hereinafter.

In the illustrated exemplary embodiment, the first plate 310 may be electrically connected to the first temperature element 330, the second temperature element 340, and the third temperature element 370. The first plate 310 may include a first branch 311, a second branch 312, and a third branch 313, and the first, second, and third temperature elements 330, 340, and 370 may be disposed on ends of the first, second, and third branches 311, 312, and 313, respectively. In this case, the third branch 313 may have a curved central portion to avoid the second temperature element 340, but a shape of the third branch 313 may be changed according to designs.

The third branch 313 may extend from the central portion connecting the first branch 311 and the second branch 312, and the second plate 320 may be attached to a portion where the third branch 313 starts. The end 320a of the second plate 320 may be electrically connected to the protection circuit module 200, and as described above, the other end 320b of the second plate 320 may be electrically connected to the first plate 310. In the illustrated exemplary embodiment, the first plate 310 and the second plate 320 may be connected to each other, for example, by welding.

The first temperature element 330 may be disposed on the end of the first branch 311 of the first plate 310. In detail, the first sub-lid 331 of the first temperature element 330 may be electrically connected to the end of the first branch 311 of the first plate 310. The second sub-lid 332 of the first temperature element 330 may be electrically connected to the first tab 362.

The second temperature plate 340 may be disposed on the end of the second branch 312 of the first plate 310. In detail, the third sub-lid 341 of the second temperature element 340 may be electrically connected to the end of the second branch 312 of the first plate 310. The fourth sub-lid 342 of the second temperature element 340 may be electrically connected to the second tab 364.

The third temperature element 370 may be disposed on the end of the third branch 313 of the first plate 310. In detail, a fifth sub-lid 371 of the third temperature element 370 may be electrically connected to the end of the third branch 313 of the first plate 310. A sixth sub-lid 372 of the third temperature element 370 may be electrically connected to the third tab 366.

In the illustrated exemplary embodiment, insulation films 361, 363, and 365 may be respectively disposed on upper portions of the first tab 362, the second tab 364, and the third tab 366. Also, the first tab 362, the second tab 364, and the third tab 366 may be electrically connected to terminals of the unit cells 100, respectively.

An insulation film may be further disposed between the first plate 310 and the second plate 320.

Referring to FIG. 6, as described above, the other end 320b of the second plate 320 may be attached to the first plate 310, and the region where the first plate 310 and the second plate 320 are connected to each other may be defined as the branch part BP. The branch part BP may be understood as a part where a current flowing through the second plate 320 is transmitted to the first plate 310, and with respect to the branch part BP, the current transmitted to the first plate 310 may be branched into the first branch 311, the second branch 312, and the third branch 313. Therefore, the branch part BP may be formed at a location where the first branch 311, the second branch 312, and the third branch 313 of the first plate 310 meet each other.

Regarding the current transmission processes, the initial current C0 flows from the protection circuit module 200 to the first plate 310 first, and the first current C1 may flow in the first plate 310. In this case, the initial current C0 may be identical to the first current C1. The first current C1 may flow from the end 310a of the first plate 310 to the other end thereof and may be transmitted to the second plate 320 through the branch part BP. The current flowing to the second plate 320 may be branched into each of the first, second, and third branches 311, 312, and 313, and the second current C2 may flow through the first branch 311, the third current C3 through the second branch 312, and the fourth current C4 through the third branch 313. In the illustrated exemplary embodiment, a sum of the second current C2, the third current C3, and the fourth current C4 may be equal to the first current C1.

In this case of the battery pack capable of being recharged and discharged, there may be a need to apply a high current for rapid recharge, and in this case, heat is generated because a high current flows in part of the temperature element unit, which is a path through which the protection circuit module is connected to the unit cells, and thus the temperature element is damaged.

In the battery pack according to exemplary embodiments, as the current flowing in the first plate 310 is branched by electrically connecting the second plate 320, in which the high current flows, to the branch part BP of the first plate 310, a relatively low current is allowed to flow in the first, second, and third temperature elements 330, 340, and 370 connected to the ends of the first, second, and third branches 311, 312, and 313 of the first plate 310, and thus damage to the temperature device during the rapid recharge may be prevented. Also, the second plate 320, in which a relatively high current flows, may include a material having a lower resistance than the first plate 310, and an exothermic reaction of the part where a high current flows may be noticeably improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A battery pack comprising:
a plurality of unit cells arranged side by side in a first direction and each comprising a first terminal and a second terminal;
a protection circuit module disposed on the plurality of unit cells; and
a temperature element unit disposed on the plurality of unit cells in the first direction and comprising a first temperature element, a second temperature element, a first plate connecting the first temperature element and the second temperature element, and a second plate having an end electrically connected to the protection circuit module and another end electrically connected to the first plate disposed between the first temperature element and the second temperature element, wherein:
a first current flow path is configured to conduct a first current through the second plate,
a second current flow path is configured to conduct a second current to the first temperature element through the first plate and a branch part that connects the second plate and the first plate,
a third current flow path is configured to conduct a third current to the second temperature element through the first plate and the branch part, and
a sum of the second current and the third current is equal to the first current.

2. The battery pack of claim 1, wherein the second current flow path passes through the first temperature element, the third current flow path passes through the second temperature element, and the second current is identical to the third current.

3. The battery pack of claim 1, wherein the first plate comprises first metal, and the second plate comprises second metal that is different from the first metal.

4. The battery pack of claim 3, wherein the second metal has a lower resistance than the first metal.

5. The battery pack of claim 3, wherein the second metal has higher thermal conductivity than the first metal.

6. The battery pack of claim 1, wherein the first plate and the second plate are welded together.

7. The battery pack of claim 1, further comprising a first tab electrically connected to the first terminal and a second tab electrically connected to the second terminal.

8. The battery pack of claim 7, wherein the first temperature element comprises a first sub-lid and a second sub-lid respectively disposed on both ends of the first temperature element,
the second temperature element comprises a third sub-lid and a fourth sub-lid disposed on both ends of the second temperature element,
an end of the first plate is electrically connected to the first sub-lid, and
another end of the first plate is electrically connected to the third sub-lid.

9. The battery pack of claim 8, wherein the first tab is electrically connected to the second sub-lid, and
the second tab is electrically connected to the fourth sub-lid.

10. The battery pack of claim 8, wherein the first tab and the second tab comprise first metal.

11. The battery pack of claim 8, wherein the first sub-lid and the second sub-lid of the first temperature element, and the third sub-lid and the fourth sub-lid of the second temperature element comprise second metal.

12. The battery pack of claim 1, further comprising a third temperature element connected to the first plate.

13. The battery pack of claim 12, further comprising a fourth current flow path configured to conduct a fourth current to the third temperature element through the first plate with respect to the branch part,
wherein the fourth current is identical to each of the second current and the third current.

14. The battery pack of claim 1, wherein the first plate and the second plate are integrally formed of the same material.

15. The battery pack of claim 14, wherein a width of the second plate is greater than a width of the first plate.

16. The battery pack of claim 14, wherein a thickness of the second plate is greater than a thickness of the first plate.

17. A battery pack comprising:
a plurality of unit cells arranged side by side in a first direction and each comprising a first terminal and a second terminal;
a protection circuit module disposed on the plurality of unit cells; and
a temperature element unit disposed on the plurality of unit cells in the first direction and comprising a first temperature element, a second temperature element, a first plate connecting the first temperature element and the second temperature element, and a second plate having an end electrically connected to the protection circuit module and another end electrically connected to the first plate disposed between the first temperature element and the second temperature element, wherein the first plate comprises first metal, and the second plate comprises second metal that is different from the first metal.

18. The battery pack of claim 17, wherein the second metal has a lower resistance than the first metal.

19. The battery pack of claim 17, wherein the second metal has higher thermal conductivity than the first metal.

20. A battery pack comprising:
a plurality of unit cells arranged side by side in a first direction and each comprising a first terminal and a second terminal;
a protection circuit module disposed on the plurality of unit cells; and
a temperature element unit disposed on the plurality of unit cells in the first direction and comprising a first temperature element, a second temperature element, a first plate connecting the first temperature element and the second temperature element, and a second plate having an end electrically connected to the protection circuit module and another end electrically connected to the first plate disposed between the first temperature element and the second temperature element, wherein the first plate and the second plate are welded together.

* * * * *